(12) United States Patent (10) Patent No.: US 12,698,124 B2
Earl-Torniainen (45) Date of Patent: Aug. 4, 2026

(54) SYSTEMS, METHODS, AND DEVICES FOR BEVERAGE CONTAINERS WITH A FOAMED BASE

(71) Applicant: Starbucks Corporation, Seattle, WA (US)

(72) Inventor: Paul Mikael Earl-Torniainen, Bonney Lake, WA (US)

(73) Assignee: Starbucks Corporation, Seattle, WA (US)

( * ) Notice: Subject to any disclaimer, the term of this patent is extended or adjusted under 35 U.S.C. 154(b) by 126 days.

(21) Appl. No.: 18/591,617

(22) Filed: Feb. 29, 2024

(65) Prior Publication Data

US 2024/0294296 A1 Sep. 5, 2024

Related U.S. Application Data

(60) Provisional application No. 63/488,012, filed on Mar. 2, 2023.

(51) Int. Cl.
| | |
|---|---|
| *B65D 1/26* | (2006.01) |
| *B29C 44/58* | (2006.01) |
| *B29K 105/04* | (2006.01) |
| *B29L 31/00* | (2006.01) |

(52) U.S. Cl.
CPC ............ *B65D 1/265* (2013.01); *B29C 44/586* (2013.01); *B29K 2105/04* (2013.01); *B29L 2031/7132* (2013.01)

(58) Field of Classification Search
CPC ........ B65D 1/265; B65D 1/0284; B65D 1/36; B65D 1/42; B29C 44/586; B29C 44/42; B29C 44/083; B29K 2105/04; B29L 2031/7132
See application file for complete search history.

(56) References Cited

U.S. PATENT DOCUMENTS

| | | | | |
|---|---|---|---|---|
| 3,510,049 | A * | 5/1970 | Donovan | B65D 85/324 47/87 |
| 6,325,691 | B1 * | 12/2001 | Witte, Jr. | B65D 85/32 446/76 |
| 10,906,216 | B2 | 2/2021 | Ichiki et al. | |
| 2004/0149598 | A1 * | 8/2004 | Scarla | B65D 1/265 206/217 |
| 2006/0118560 | A1 * | 6/2006 | Schur | A47G 19/22 220/508 |

(Continued)

FOREIGN PATENT DOCUMENTS

| | | |
|---|---|---|
| AU | 2017-214327 | 7/2022 |
| WO | WO 2004/098856 | 11/2004 |

OTHER PUBLICATIONS

International Search Report and Written Opinion in application No. PCT/US2024/017811, mailed on May 14, 2024, in 14 pages.

*Primary Examiner* — Shawn M Braden
(74) *Attorney, Agent, or Firm* — Knobbe, Martens, Olson & Bear, LLP

(57) ABSTRACT
A container may include a sidewall. A container may include a base with a first portion and a second portion. The second portion may include a plurality of lobes with a thickness greater than a thickness of the first portion. The plurality of lobes may be formed by impregnating plastic with a foaming agent that may cause the plastic to foam during manufacturing.

25 Claims, 9 Drawing Sheets

(56)     References Cited

U.S. PATENT DOCUMENTS

| | | | |
|---|---|---|---|
| 2013/0180998 A1* | 7/2013 | Nakayama | B65D 1/0261 |
| | | | 220/609 |
| 2013/0200089 A1* | 8/2013 | Vidal | A45F 5/00 |
| | | | 29/428 |
| 2023/0227199 A1* | 7/2023 | Clarke | B65D 1/265 |
| | | | 206/557 |

* cited by examiner

Section A

| | |
|---|---|
| Impregnate plastic with blowing agent | 202C |
| Blow plastic into mold | 204C |
| Move mold away from plastic at location of second portion | 206C |

| Impregnate plastic with blowing agent | 202D |
| Place label in mold | 203D |
| Blow plastic into mold | 204D |
| Move mold away from plastic | 206D |

SYSTEMS, METHODS, AND DEVICES FOR BEVERAGE CONTAINERS WITH A FOAMED BASE

INCORPORATION BY REFERENCE TO ANY PRIORITY APPLICATIONS

This application claims priority to U.S. Provisional Patent Application No. 63/488,012, filed Mar. 2, 2023, the entirety of which is incorporated herein by reference.

FIELD

The present disclosure relates to systems, methods, and devices for beverage container with an improved base, such as in certain embodiments, methods for manufacturing a base of a container with a plurality of lobes which in certain embodiments can be foamed lobes.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

In some embodiments, a fluid container can include: a sidewall; and a base including: a first portion including a first thickness; a second portion including a second thickness, wherein the sidewall is coupled to an edge of the base, and wherein the second thickness is greater than the first thickness, and the second portion includes expanded plastic.

In some embodiments, the expanded plastic can include foamed plastic.

In some embodiments, second portion can include a plurality of lobes.

In some embodiments, each of the plurality of lobes can extend radially outward from a center of the base to the edge of the base.

In some embodiments, the plurality of lobes can be equally spaced around the center of the base.

In some embodiments, each of the plurality of lobes can be surrounded by the first portion.

In some embodiments, the plurality of lobes can be connected.

In some embodiments, the second portion can include between 3 lobes and 7 lobes.

In some embodiments, the second thickness near the edge of the base can be greater than the second thickness at the center of the base.

In some embodiments, an inner surface of the base can be substantially planar.

In some embodiments, the base of fluid container can be placed on a surface, the second portion contacts the surface and the first portion does not contact the surface.

In some embodiments, a method of manufacturing a fluid container can include the steps of: impregnating a plastic with an expanding agent; injecting the plastic into a cavity of a mold; and at a predetermined time after injecting the plastic into the cavity of the mold, moving the mold away from the plastic at a location of a base of the container, such that at least a portion of the plastic at a location of a base of the container expands to form a first portion and a second portion, wherein the second portion includes a thickness larger than a thickness of the first portion.

In some embodiments, impregnating the plastic with the expanding agent can include impregnating the plastic at a location of the second portion with the expanding agent.

In some embodiments, impregnating the plastic with the expanding agent can include impregnating the plastic at a location of the first portion with a first expanding agent and impregnating the plastic at a location of the second portion with a second expanding agent, wherein the second expanding agent expands more than the first expanding agent.

In some embodiments, impregnating the plastic with the expanding agent can include impregnating the plastic at a location of the second portion with more expanding agent than the first portion.

In some embodiments, moving the mold away from the plastic at the location of the base of the container can include moving a portion of the mold at a location of the second portion away from the plastic so the portion of the plastic at the location of the base of the container that expands is the second portion.

In some embodiments, moving the mold away from the plastic at the location of the base of the container can further include moving a portion of the mold at a location of the first portion away from the plastic after the second portion expands.

In some embodiments, a portion of the cavity of the mold at a location of the first portion can include a first thickness, and a portion of the cavity of mold at a location of the second portion can include a second thickness, wherein the second thickness can be larger than the first thickness, and wherein the predetermined time can include a time when a temperature of plastic of the first portion is below a glass transition temperature and a temperature of plastic of the second portion is above the glass transition temperature.

In some embodiments, the method can include the step of: before injecting the plastic into the cavity of the mold, placing one or more labels in the mold.

In some embodiments, the one or more labels can include a shape of the second portion, and the one or more labels can be placed in the mold at a location of the second portion.

In some embodiments, the one or more labels can include a shape of the first portion, and the one or more labels can be placed in the mold at a location of the first portion.

In some embodiments, an inner surface of the base can be substantially planar.

In some embodiments, the expanding agent can be a foaming agent.

In some embodiments, at least the portion of the plastic at the location of the base of the container expands, at least the portion of the plastic at the location of the base of the container can foam.

In some embodiments, the second portion can include a plurality of lobes.

BRIEF DESCRIPTION OF THE DRAWINGS

Various embodiments are depicted in the accompanying drawings for illustrative purposes and the thickness, the size, and the shape of various features should in no way be interpreted as limiting the scope of the embodiments. Furthermore, various features of different disclosed embodiments can be combined to form additional embodiments, which are part of this disclosure.

DETAILED DESCRIPTION

Figure 1A:
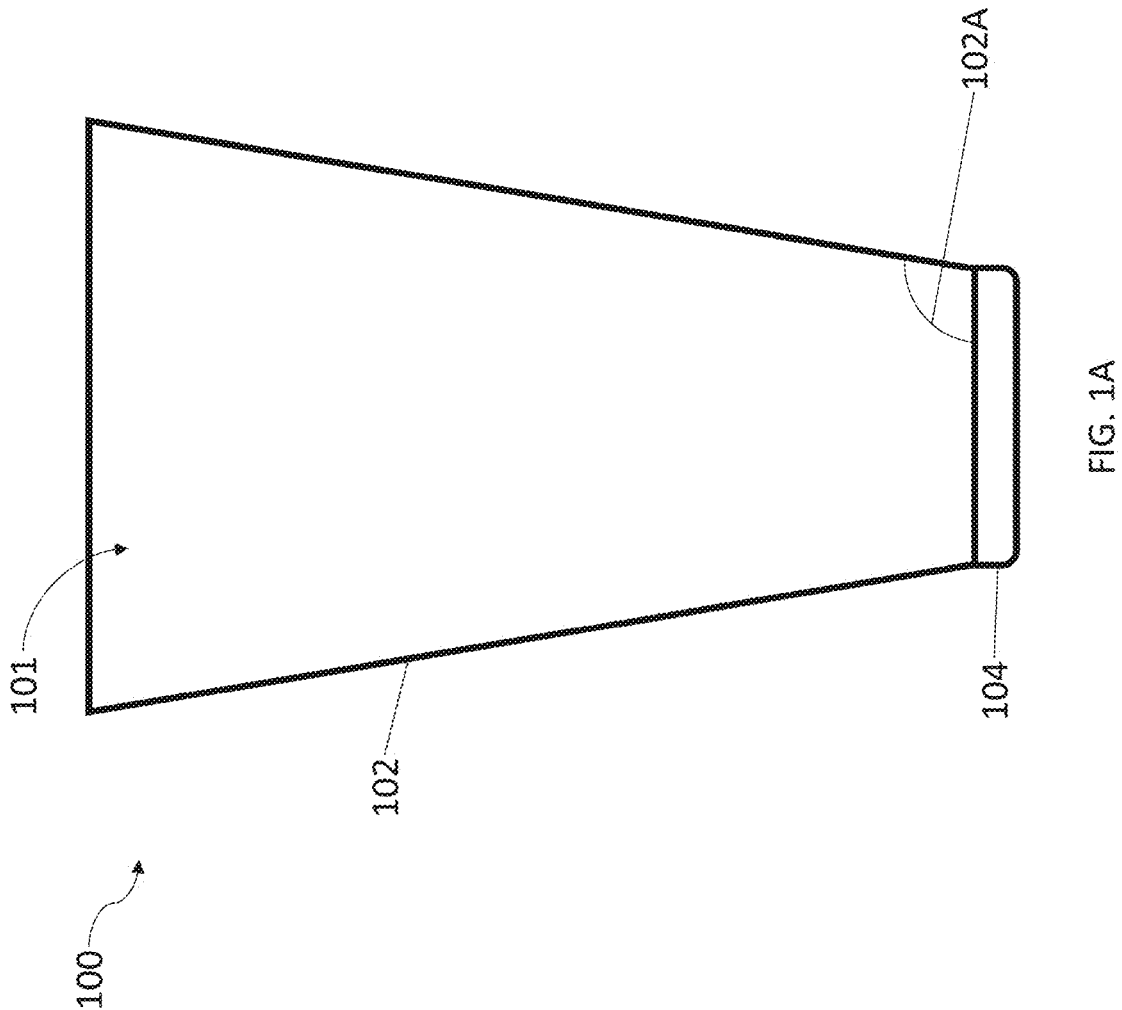
FIG. 1A illustrates an embodiment of a container with a foamed base.

Although several embodiments, examples, and illustrations are disclosed below, it will be understood by those of ordinary skill in the art that the system, methods, and devices described herein extend beyond the specifically disclosed embodiments, examples, and illustrations and includes other uses of the system, methods, and devices and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the system, methods, and devices herein described.

Containers, especially paper cups and plastic cups, typically have a skirt or extension of the sidewall of the container that extends beyond a base of the container. When the container is placed on a surface, the skirt or extension of the sidewall contacts the surface so the base does not contact the surface. Therefore, if a beverage or other substance in the container is hot or cold, the base of the container does not contact the surface and potentially damage the surface on which the base rests.

However, dirt or other debris trapped or stuck where the skirt or extension of the sidewall is coupled to the base can be difficult to clean. If the container is washed in a dishwasher, the skirt or extension of the sidewall may trap water on the base causing the base of the container to not be cleaned or dry properly.

In accordance with several embodiments, containers described herein advantageously have a base comprising several raised portions which in certain embodiments can be formed by foaming or otherwise expanding a section of the base during a manufacturing step so as to form a foamed or expanded portion. The foamed or expanded portion can provide a temperature barrier between a substance in the container and a surface or a user. Having a foamed or expanded portion of the base eliminates the need to have a skirt or extension of the sidewall. Therefore, water can run off the base of the container when the container is washed in a dishwasher so the container can be cleaned and dry properly. Additionally, the foamed portion of the base may have a larger thickness than containers with a skirt or extension of the sidewall increasing an impact resistance of the base of the container. Another potential advantage of the foamed/expanded portion is that the foamed/expanded portion can provide increased impact resistance and can reduce the formation of fractures or cracks in the base of the container when the container is dropped.

FIGS. 1A-1D show a container 100 for holding a fluid, a beverage, ingredients, such as dry ingredients, and/or any other substances. The container 100 can include a sidewall 102 and a base 104. The sidewall 102 may be coupled to the base 104 at an edge 104A of the base 104. The sidewall 102 may be coupled to the base at an angle 102A. In certain embodiments, the angle 102A may be between about 90 degrees and about 120 degrees. In certain embodiments, the angle 102A may be between about 90 degrees and about 100 degrees. The sidewall 102 and the base 104 may form a recess 101 for holding or containing a substance. The sidewall 102 and/or the base 104 may be plastic such as vinyl, polystyrene, polyethylene, polypropylene, polyester, polyethylene terephthalate (PET), polyolefins, phenolics, silicones, cellulose acetate, and urethanes.

The base may include an inner surface 103A. The inner surface 103A may be flat or substantially flat. In certain embodiments, the inner surface 103A maybe planar or substantially planar. In certain embodiments, the inner surface 103A may be smooth or substantially smooth.

Figures 1B, 1C:
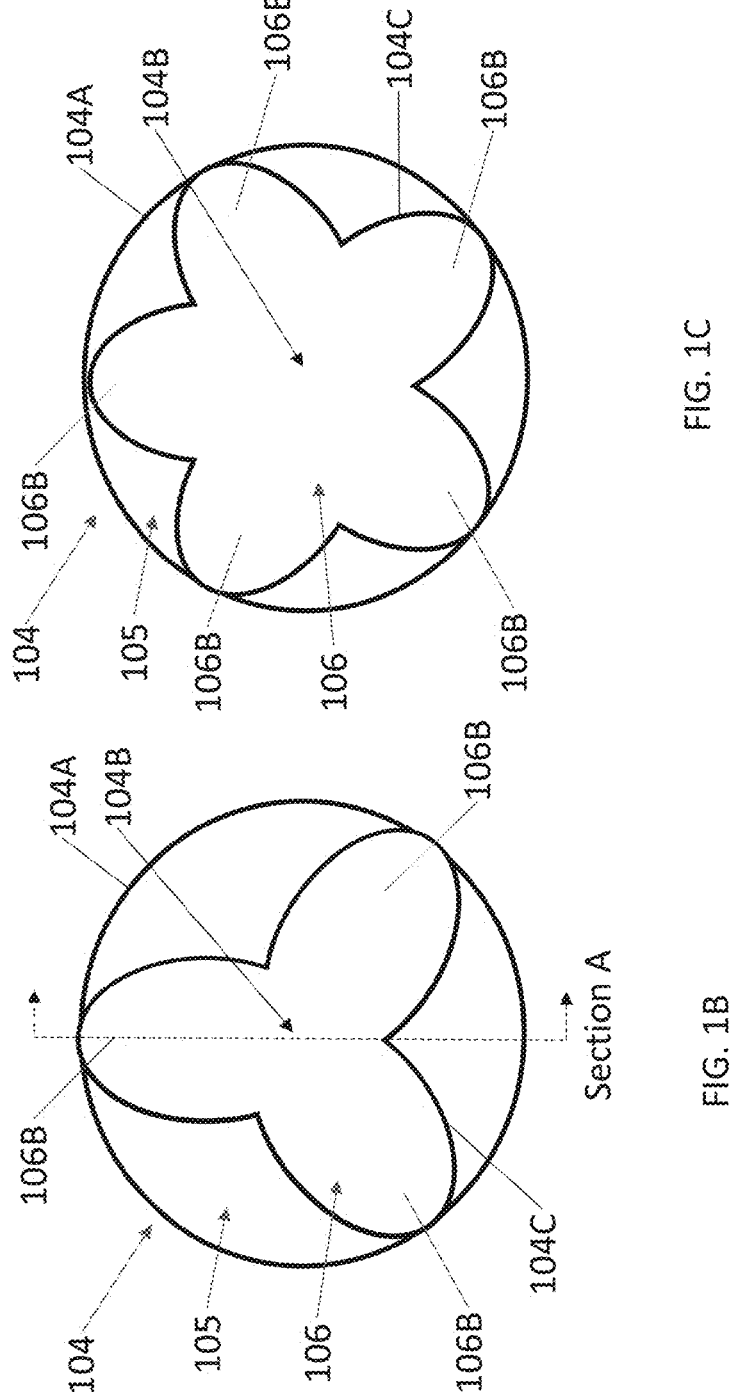
FIGS. 1B and 1C illustrate embodiments of the foamed base of the container of FIG. 1A.

In certain embodiments, the base 104 may include a first portion 105 and a second portion 106 which can be seen at FIGS. 1B and 1C. The first portion 105 and the second portion 106 may intersect at a border 104C. The first portion 105 may be include a thickness 105A, and the second portion 106 may include a thickness 106A. The thicknesses 105A, 106A may be a distance from the inner surface 103 (see FIG. 1D) to a bottom surface 103B, wherein the bottom surface 103B is the outer surface of the base 104 formed by the first portion 105 and/or the second portion 106. In certain embodiments, the thickness 106A of the second portion 106 may be larger than the thickness 105A of the first portion 105. In certain embodiments, a largest thickness 106A of the second portion 106 may be larger than a largest thickness 105A of the first portion 105. In certain embodiments, the thickness 105A of the first portion 105 may be about 0.5 mm. In certain embodiments, the thickness 105A of the first portion 105 may be about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, and/or any other value between the aforementioned values. In certain embodiments, the thickness 105A of the first portion 105 may be between about 0.1 mm and about 1.0 mm. In certain embodiments, the thickness 105A of the first portion 105 may be between about 0.3 mm and about 0.7 mm. In certain embodiments, the thickness 106A of the second portion 106 may be about 2.0 mm. In certain embodiments, the thickness 106A of the second portion 106 may be about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, about 3.7 mm, about 3.8 mm, about 3.9 mm, about 4.0 mm and/or any other value between the aforementioned values. In certain embodiments, the thickness 106A of the second portion 106 may be between about 1.0 mm and about 4.0 mm. In certain embodiments, the thickness 106A of the second portion 106 may be between about 1.0 mm and about 3.0 mm. In certain embodiments, the thickness 106A of the second portion 106 may be between about 1.5 mm and about 2.5 mm.

In certain embodiments, the thickness 106A of the second portion 106 may be the same as the thickness 105A of the first portion 105 at the border 104C. In these embodiments, the thickness 106A of the second portion 106 may gradually increase from the border 104C. Accordingly, the thickness 106A of the second portion 106 may be larger at or near the edge 104A of the base 104 than a thickness 106A of the second portion 106 at the center 104B of the base 104.

In certain embodiments, the second portion 106 may be raised from the first portion 105 such that when the base 104 of the fluid container 100 is placed on a surface, only the second portion 106 contacts the surface.

The second portion 106 of the base 104 may be expanded plastic which can be expanded as described below by foaming the plastic to form a foamed plastic. In certain embodiments, the second portion 106 and the first portion 105 may be foamed. In certain embodiments, the second portion 106 may be post-mold expanded or foamed. In certain embodiments, the second portion 106 may be expanded or foamed after the fluid container 100 is removed from a mold 300, shown in FIGS. 3A and 3B, or a portion of the mold 300 and/or after the mold 300 or a portion of the mold 300 is moved away from the fluid container 100. The second portion 106 may be expanded/foamed more than the first portion 105, or the first portion 105 may be expanded/foamed less than the second portion 106. In certain embodiments, the second portion 106 may be expanded/foamed less at the border 104C of the second portion 106 and the first portion 105.

In certain embodiments, an amount the first portion 105 and the second portion 106 are expanded/foamed may determine the thickness 105A, 106A of the first portion 105 and the second portion 106. The first portion 105 and the second portion may be thicker the more the first portion 105 and the second portion 106 are expanded/foamed.

As described further below with reference to FIGS. 2A-2D in certain embodiments the container 100 may be formed from an injection molding process. The injection molding process, especially when done with plastic impregnated with a foaming agent, may be imprecise and surfaces formed by the injection molding process may be uneven. The second portion 106 of the base 104 may not be a smooth surface which may cause the container 100 to be unstable or rock when placed on a surface with the second portion 106 contacting the surface.

Therefore, in order to increase the stability and reduce rocking when the container is placed on a surface with the second portion 106 contacting the surface, the second portion 106 may be formed by a plurality of lobes 106B. The lobes 106B may include a shape when viewed from a bottom plan view. The shape of the lobes 106B may be a circle, a triangle, a rectangle, a square, a trapezoid, a semicircle, an ellipse, a pentagon, a hexagon, an octagon, and/or any other shape.

The lobes 106B may be located on the base 104 such that the lobes 106B extend from a center 104B of the base 104 to an edge 104A of the base 104. In certain embodiments, the lobes 106B may extend radially outward from the center 104B of the base 104 to the edge 104A of the base 104. In certain embodiments, the lobes 106B may be equally space around the center 104B of the base 104.

In certain embodiments, the lobes 106B may be separate (i.e., first portion 105 surrounds each lobe 106B) or the lobes 106B may be connected. In certain embodiments, the lobes 106B may be connected at or near the center 104B of the base 104. The second portion 106 may include 1 lobe, 2 lobes, 3 lobes, 4 lobes, 5 lobes, 6 lobes, 7 lobes, 8 lobes, 9 lobes, and/or 10 lobes or more lobes. In certain embodiments, the second portion 106 may include between 3 lobes and 8 lobes. In certain embodiments, the second portion 106 may include between 3 lobes and 5 lobes. As shown in FIG. 1B, in certain embodiments, the second portion 106 may include 3 lobes 106B. As shown in FIGS. 1C, in certain embodiments, the second portion 106 may include 5 lobes 106B.

Figure 1D:
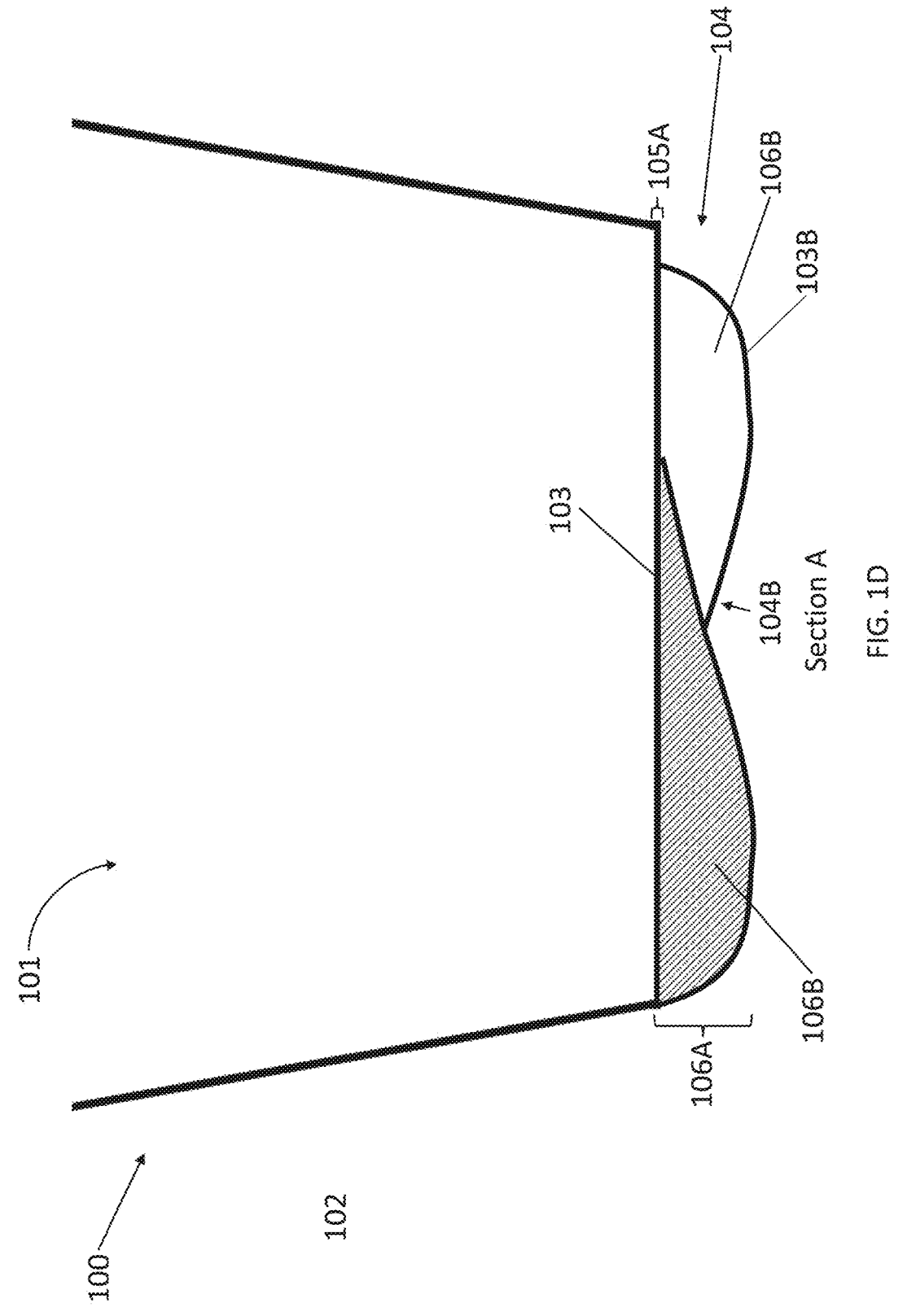
FIG. 1D illustrates Section A of the container of FIG. 1B.

As shown in FIG. 1D, in certain embodiments, a thickness 106A of each lobe 106B may be larger at or near the edge 104A of the base 104 than a thickness 106A of each lobe 106B at the center 104B of the base 104. In certain embodiments, the second portion 106 and/or lobes 106B may only be positioned or located at or near the edge 104A of the base 104 such that the first portion 105B includes the entire base 104 except for a portion of the base 104 at or near the edge 104A of the base 104.

Figure 2A:
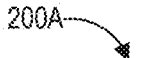
FIGS. 2A-2D illustrate schematics of methods of manufacturing a container with a foamed base.
Figure 2A:
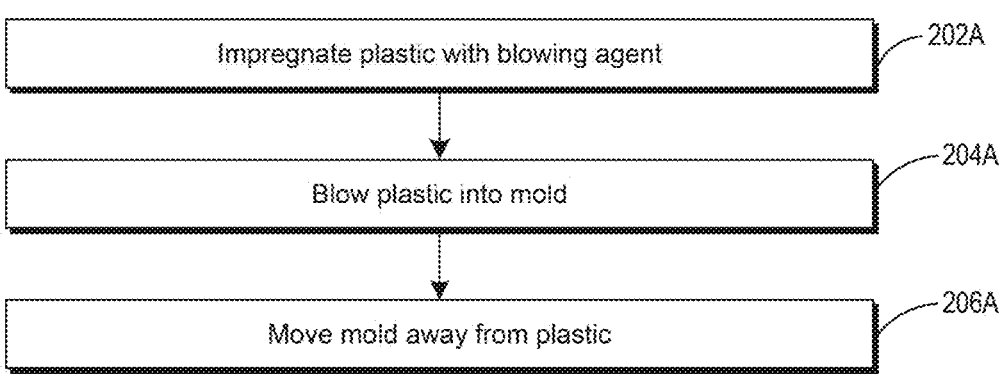

FIG. 2A shows a schematic of a method 200A of manufacturing the container 100 in which the expanded portions are formed by foaming a portion of the cup to form foamed portions on the bottom of the cup. At step 202A of method 200A, plastic used to make the container 100 may be impregnated with an expanding agent at a location of the second portion 106. In certain embodiments, all of the plastic at the location of the second portion 106 may be impregnated with a same amount of expanding agent, such that after the plastic foams, the thickness of all of the second portion 106 and/or the lobes 106B is the same thickness. In certain embodiments, portions of the second portion 106 may be impregnated with more expanding agent than other portions of the second portion 106 such that the thickness of the second portion 106 is a different thickness after the plastic foams. In certain embodiments, a portion of the plastic at the location of the second portion 106 may be impregnated with an expanding agent that foams the plastic less than an expanding agent impregnated in the plastic at the location of the rest or remainder of the second portion 106 (i.e., less volatile, less reactive, etc.).

In certain embodiments, the plastic may be impregnated with an expanding agent at the location of the first portion 105. The plastic at the location of the first portion 105 may be impregnated with less expanding agent than the plastic at the location of the second portion 106. The plastic at the location of the first portion 105 may be impregnated with an expanding agent that foams the plastic at the location of the first portion 105 less than the plastic at the location of the second portion 106 (i.e., less volatile, less reactive, etc.).

Figure 3A:
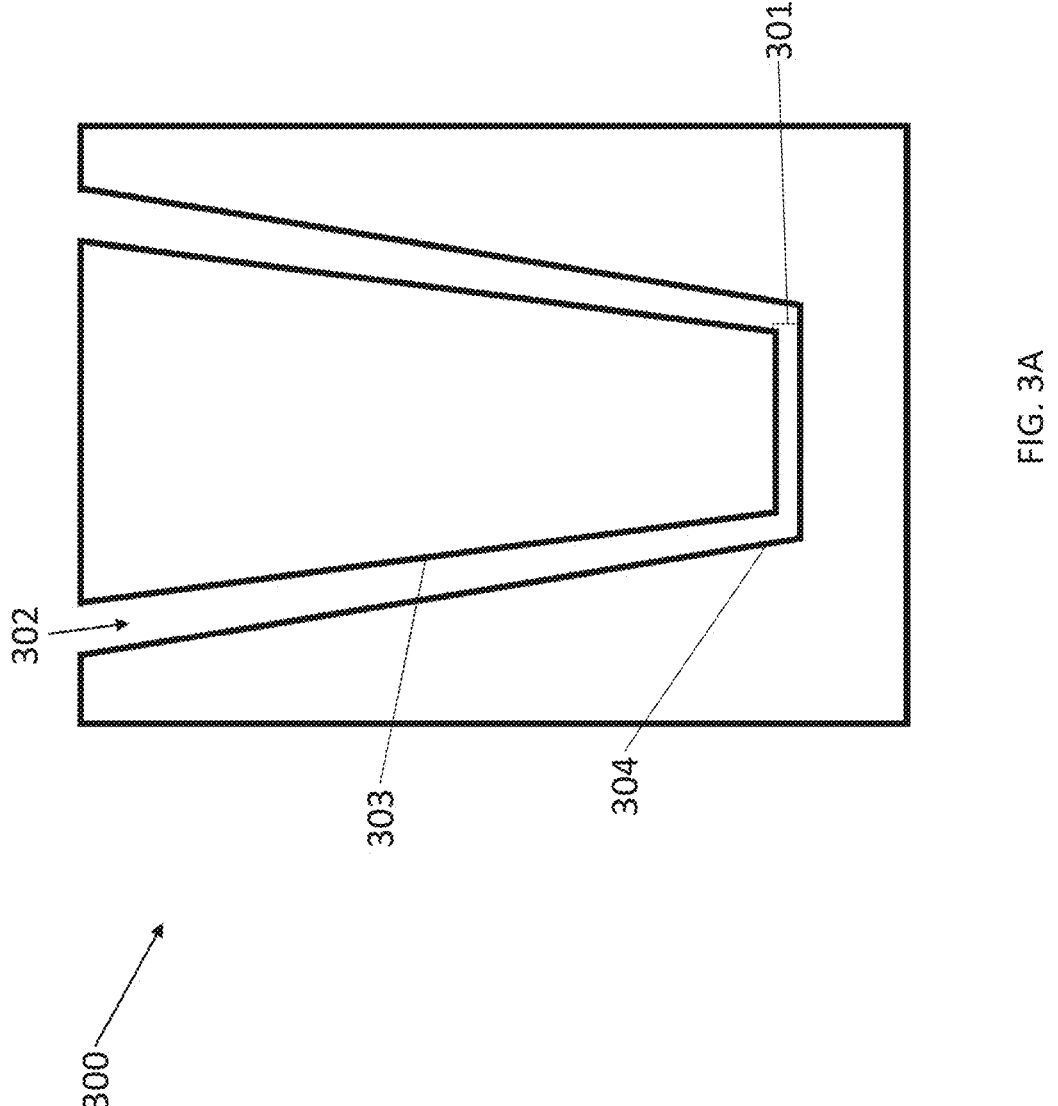
FIGS. 3A and 3B illustrate a mold for manufacturing a container with a foamed base.

At step 204A, the plastic may be injected into a mold 300, shown in FIG. 3A, (i.e., injection molding) to form the container 100. The plastic may be injected into a cavity 302 of the mold 300. The cavity 302 can include an inner surface 303 and an outer surface 304. After the plastic is injected into the cavity 302 at step 204A, the mold 300 may be moved away from the plastic, now shaped as the container 100, at step 206A. In certain embodiments, the outer surface 304 may be moved away from the plastic. In certain embodiments, a portion of the outer surface 304 at the location of the base 104 of the container may be moved away from the plastic. The mold 300 and/or the outer surface 304 may be moved away from the plastic before a temperature of the plastic drops below a glass transition temperature. In this way, the plastic impregnated with an expanding agent may foam/expand, increasing a thickness of the plastic.

In certain embodiments, if the only the plastic at a location of the second portion 106 is impregnated with an expanding agent, only the plastic at the location of the second portion 106 may foam to form the lobes 106B. In certain embodiments, if the plastic at the location of the first portion 105 is impregnated with less expanding agent than the plastic at the location of the second portion 106, the plastic at the location of the second portion 106 may foam more than the plastic at the location of the first portion 105 thereby forming the lobes 106B. In certain embodiments, if the plastic at the location of the first portion 105 is impregnated with an expanding agent that foams less than the expanding agent impregnated in the plastic at the location of the second portion 106, the plastic at the location of the second portion 106 may foam more than the plastic at the location of the first portion 105 thereby forming the lobes 106B.

Figure 2B:
Figure 2B:
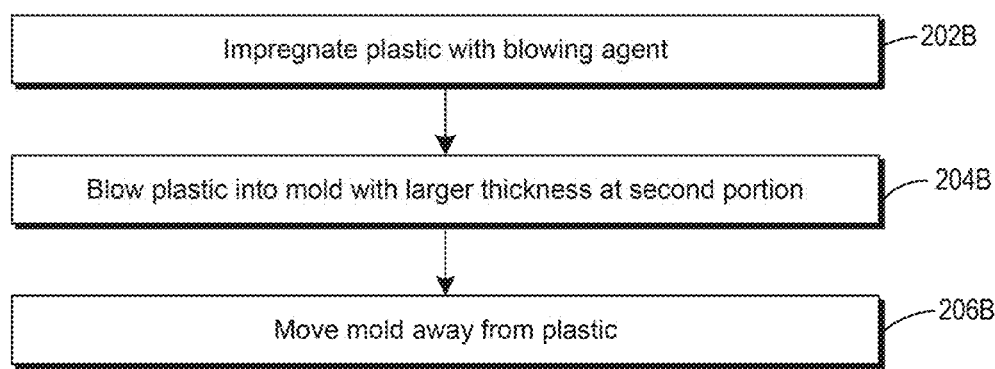

FIG. 2B shows a schematic of another method 200B of manufacturing the container 100. At step 202B of method 200B, the plastic used to make the container 100 may be impregnated with an expanding agent. In certain embodiments, the plastic at the location of the second portion 106 may be impregnated with an expanding agent. In certain embodiments, the plastic at the location of the first portion 105 and the plastic at the location of the second portion 106 may be impregnated with an expanding agent. In certain embodiments, the expanding agent may include a physical expanding agent and/or a chemical expanding agent. In some embodiments, the physical expanding agent may include a gas. The physical expanding agent may be compressed when the plastic is impregnated with the physical expanding agent and the plastic may be injected into a mold 300 at a pressure. When the pressure is removed or released from the plastic, the gas may expand to form a foamed structure. In some embodiments, the chemical expanding agent may include any substance that may generate gas as a result of a chemical reaction. The chemical expanding agent may be compressed when the plastic is impregnated with the chemical expanding agent and the plastic may be injected into the mold 300 at a pressure. The chemical expanding agent may undergo a chemical reaction after the plastic is impregnated with the chemical expanding agent and/or before a pressure is removed or released from the plastic. When the pressure is removed or released from the plastic, the gas generated as a result of the chemical reaction may expand to form a foamed structure. At step 204B, the plastic may be injected into the mold 300 (i.e., injection molding) to form the container 100. The plastic may be injected into a cavity 302 of the mold 300. The cavity 302 can include an inner surface 303 and an outer surface 304. A thickness 301 of the cavity 302 of the mold 300 of method 200B may be greater at the location of the second portion 106 than the location of the first portion 105. In this way, when the plastic is injected into the mold 300, the plastic at the location of the second portion 106 has a greater thickness than the plastic at the location of the first portion 105. Therefore, the plastic at the location of the first portion 105 may cool faster than the plastic at the location of the second portion 106 such that a temperature of the plastic at the location of the first portion 105 may be below a glass transition temperature when a temperature of the plastic at the location of the second portion 106 is above the glass transition temperature.

After the plastic is injected into the cavity 302 of the mold 300 at step 204B, a portion of the mold 300 may be moved away from the plastic, now shaped as the container 100, at step 206B. In certain embodiments, a portion of an outer surface 304 of the cavity 302 may be moved away from the plastic. The mold 300 and/or the outer surface 304 may be moved away from the plastic after a predetermined time.

In certain embodiments, the predetermined time may be a time after the temperature of the plastic at the location of the first portion 105 drops below the glass transition temperature and before the temperature of the plastic at the location of the second portion 106 drops below the glass transition temperature. In certain embodiments, the predetermined time may be a time when the temperature of the plastic at the location of the first portion 105 is at or above the glass transition temperature. The plastic at the location of the first portion 105 may be more rigid or harder than the plastic at the location of the second portion 106 so the plastic at the location of the first portion 105 may not foam or expand as much as the plastic at the location of the second portion 106. In this way, the plastic at the location of the second portion 106 may foam or expand more than the plastic at the location of the first portion 105 thereby forming the lobes 106B.

Figure 2C:
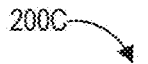
Figure 2C:
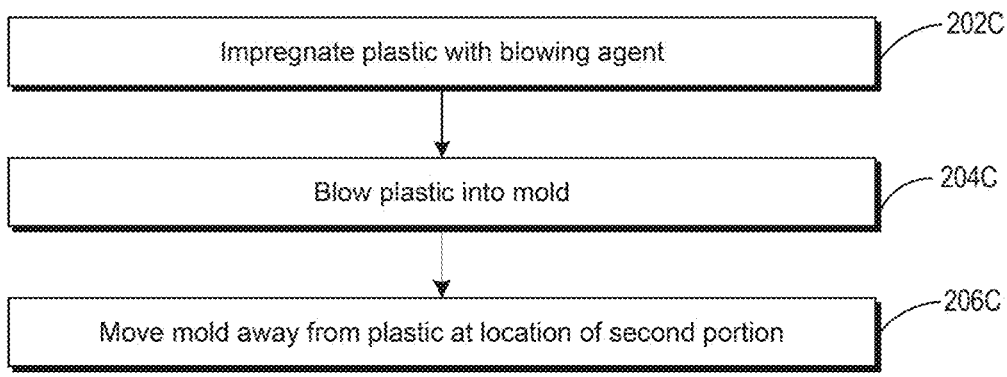

FIG. 2C shows a schematic of another method 200C of manufacturing the container 100. At step 202C of method 200C, the plastic used to make the container 100 may be impregnated with an expanding agent. In certain embodiments, the plastic at the location of the second portion 106 may be impregnated with an expanding agent. In certain embodiments, the plastic at the location of the first portion 105 and the plastic at the location of the second portion 106 may be impregnated with an expanding agent.

Figure 3B:
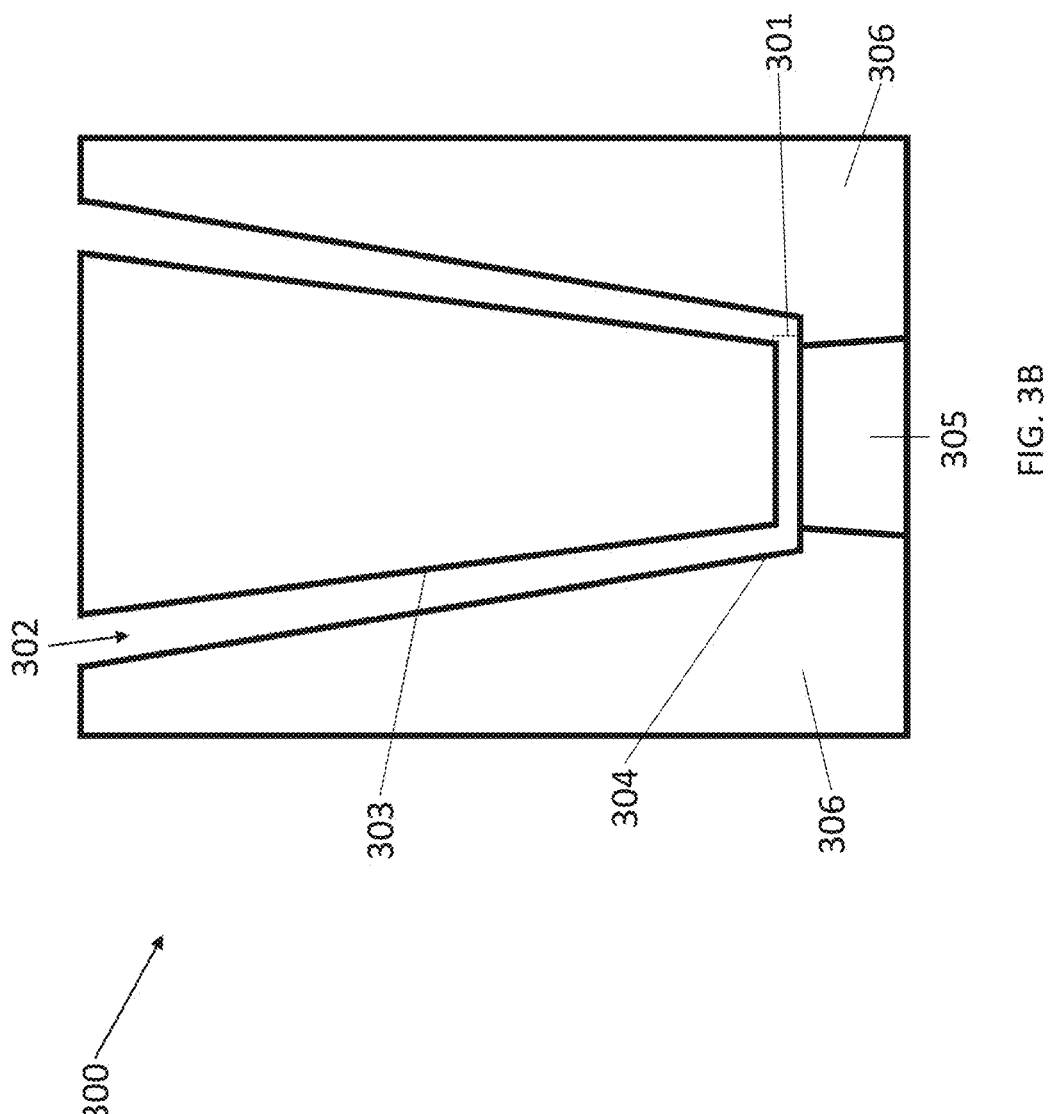

At step 204C, the plastic may be injected into a mold 300 (i.e., injection molding) to form the container 100. The plastic may be injected into a cavity 302 of the mold 300. The cavity 302 can include an inner surface 303 and an outer surface 304. The outer surface 304 of the cavity 302 may include a first mold portion 305 and a second mold portion 306 as shown in FIG. 3B. The first mold portion 305 may be a shape of the base 104 without the second mold portion 106. The second mold portion 306 may be a same shape as the second mold portion 106.

In certain embodiments, the mold 300 and/or the first mold portion 305 may lower a temperature of the plastic at the location of the first portion 105 faster than the plastic at the location of the second portion 106. In certain embodiments, the first mold portion 305 may be a lower temperature than the second mold portion 306 such that the plastic at the location of the first portion 105 drops below a glass transition temperature before the plastic at the location of the second portion 106. In certain embodiments, the second mold portion 306 may be a higher temperature than the first mold portion 305 such that the plastic at the location of the second portion 106 stays or is maintained above the glass transition temperature.

After the plastic is injected into the cavity 302 of the mold 300 at step 204C, a portion of the outer surface 304 of the cavity 302 may be moved away from the plastic at step 206C. In certain embodiments, the second mold portion 306 may be moved away from the plastic before a temperature of the plastic drops below a glass transition temperature. In this way, the plastic at the location of the second portion 106 impregnated with an expanding agent may foam, increasing a thickness of the plastic to form the second portion 106 and/or lobes 106B.

In certain embodiments, the second mold portion 306 may include a plurality of sub portions. The plurality of sub portions of the second mold portion 306 may be moved away from the plastic at various times to control the shape of the second portion 106 and/or the lobes 106B.

Figure 2D:
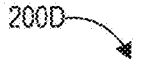
Figure 2D:
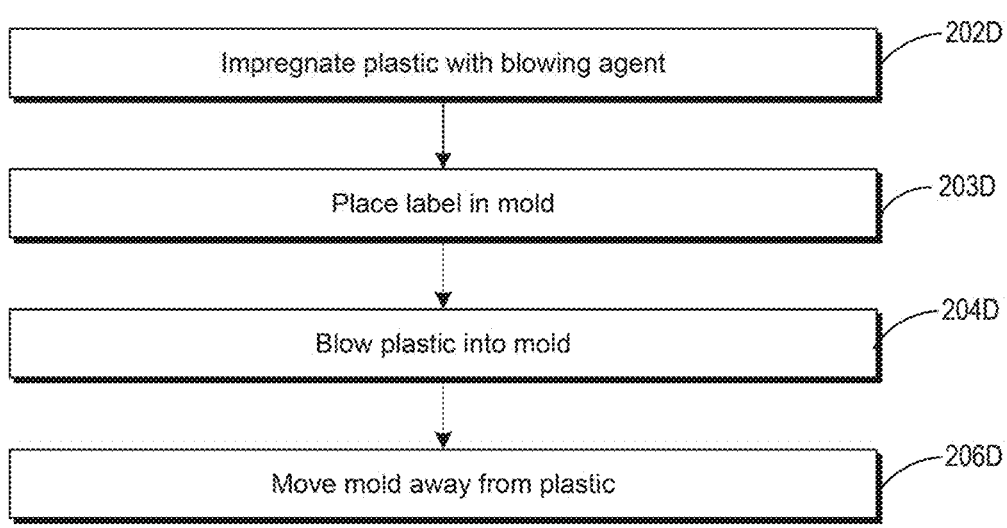

FIG. 2D shows a schematic of another method 200D of manufacturing the container 100. At step 202D of method 200D, the plastic used to make the container 100 may be impregnated with an expanding agent. In certain embodiments, the plastic at the location of the second portion 106 may be impregnated with an expanding agent. In certain embodiments, the plastic at the location of the first portion 105 and the plastic at the location of the second portion 106 may be impregnated with an expanding agent.

At step 203D, one or more labels may be placed in a mold 300. The one or more labels may be placed on an inner surface 303 of a cavity and/or an outer surface 304 of the cavity 302. In certain embodiments, the one or more labels may be the same shape as the first portion 105. The one or more labels may be placed in the mold 300 at the location of the first portion 105. In certain embodiments, the one or more labels may be the same shape as the second portion 106. The one or more labels may be placed in the mold 300 at the location of the second portion 106.

At step 204D, the plastic may be injected into the mold 300 (i.e., injection molding) to form the container 100. The plastic may be injected into a cavity 302 of the mold 300. After the plastic is injected into the cavity 302 the mold 300 at step 204D, the mold 300 may be moved away from the plastic, now shaped as the container 100, at step 206D. In certain embodiments, an outer surface 304 of the cavity 302 of the mold 300 may be moved away from the plastic. The mold 300 and/or the outer surface 304 may be moved away from the plastic before a temperature of the plastic drops below a glass transition temperature. In this way, the plastic impregnated with an expanding agent may foam, increasing a thickness of the plastic.

In the embodiments where the one or more labels may be the same shape as the first portion 105, the labels may prevent or inhibit the plastic at the location of the first portion 105 from foaming or expanding. In certain embodiments, the labels may prevent or inhibit the plastic at the location of the first portion 105 from foaming or expanding as much as the plastic at the location of the second portion 106.

In the embodiments where the one or more labels may be the same shape as the second portion 106, the labels may prevent the plastic at the location of the second portion 106 from cooling as rapidly as the plastic at the location of the first portion 105. In this way, a temperature of the plastic at the location of the first portion 105 may drop below a glass transition temperature before the plastic at the location of the second portion 106. The mold 300 and/or the outer surface 304 may be moved away from the plastic before a temperature of the plastic at the location of the second portion 106 drops below a glass transition temperature. The plastic at the location of the first portion 105 may partially or completely solidify or harden such that the plastic at the location of the first portion 105 is restricted or prevented from foaming and/or expanding or foaming and/or expanding as much as the plastic at the location of the second portion 106.

In some embodiments, the plastic of methods 200A-200D used to make the container 100 may be impregnated with an expanding agent right before the plastic is injected into the mold, or the plastic may be pre-impregnated by a third party. In some embodiments, the expanding agent of method 200A-200D may be a foaming agent.

Although methods 200A-200D described above include injection molding, in some embodiments, methods 200A-200D may include blow molding, thermoforming, and/or any other plastic manufacturing processes.

It should be appreciated that in certain embodiments, aspects of the methods 200A-200D of FIGS. 2A-2D, as described above, may be combined in various combinations to form sub-combinations of the methods 200A-200D. In certain embodiments, one or more steps of methods 200A-200D may be removed from, added to, and/or combined with any of the methods 200A-200D.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

SUMMARY

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. In addition, although this disclosure describes certain embodiments and examples of containers and methods of manufacturing containers, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of preparing edible extracts and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A unitary fluid container comprising:
a sidewall; and
a base comprising:
    a first portion comprising a first thickness;
    a second portion comprising a second thickness,
wherein the sidewall is molded to the base and extending from an edge of the base,
wherein the sidewall and the base comprise expanded plastic, and
wherein the expanded plastic at a location of the second portion of the base is expanded more than the expanded plastic at a location of the first portion of the base so the second thickness is greater than the first thickness.

2. The unitary fluid container of claim 1, wherein the expanded plastic is foamed plastic.

3. The unitary fluid container of claim 1, wherein the second portion comprises a plurality of lobes.

4. The unitary fluid container of claim 3, wherein each of the plurality of lobes extend radially outward from a center of the base to the edge of the base.

5. The unitary fluid container of claim 4, wherein the plurality of lobes are equally spaced around the center of the base.

6. The unitary fluid container of claim 3, wherein each of the plurality of lobes are surrounded by the first portion.

7. The unitary fluid container of claim 3, wherein each of the plurality of lobes are connected.

8. The unitary fluid container of claim 3, wherein the second portion comprises between 3 lobes and 7 lobes.

9. The unitary fluid container of claim 1, wherein the second thickness near the edge of the base is greater than the second thickness at a center of the base.

10. The unitary fluid container of claim 1, wherein an inner surface of the base is substantially planar.

11. The unitary fluid container of claim 1, wherein when the base of fluid container is placed on a surface, the second portion contacts the surface and the first portion does not contact the surface.

12. The unitary fluid container of claim 4, wherein when the base of the fluid container is placed on a surface the lobes contact the surface.

13. The unitary fluid container of claim 4, wherein when the base of the fluid container is placed on a surface only the lobes contact the surface.

14. The unitary fluid container of claim 1, wherein base comprises an inner surface and an outer surface that contacts a surface when the base of the fluid container is placed on the surface, wherein the first thickness and second thickness are measured between the inner surface and the outer surface.

15. The unitary fluid container of claim 10, wherein the first thickness and second thickness are measured between the inner surface of the base and an outer surface of the base that a surface when the base of the fluid container is placed on the surface.

16. An expanded plastic fluid container comprising:
an expanded plastic sidewall; and
an expanded plastic base, the expanded plastic sidewall is molded to the expanded plastic base and extending from an edge of the expanded plastic base, the expanded plastic base comprising:
a first portion comprising a first thickness;
a second portion comprising a plurality of lobes having a second thickness,
wherein expanded plastic at the second portion of the expanded plastic base is expanded more than expanded plastic at the first portion of the base so the second thickness is greater than the first thickness such that when the expanded plastic base of the expanded plastic container is placed on a surface the plurality of lobes contact the surface.

17. The expanded plastic fluid container of claim 16, wherein the plurality of lobes extend radially outward from a center of the base to the edge of the base.

18. The expanded plastic fluid container of claim 16, wherein when the base of the fluid container is placed on the surface only the plurality of lobes contact the surface.

19. The expanded plastic fluid container of claim 16, wherein the plurality of lobes are equally spaced around a center of the base.

20. The expanded plastic fluid container of claim 16, wherein each of the plurality of lobes are surrounded by the first portion.

21. The expanded plastic fluid container of claim 16, wherein each of the plurality of lobes are connected.

22. The expanded plastic fluid container of claim 16, wherein the second portion comprises 3 or more lobes.

23. The expanded plastic fluid container of claim 16, wherein the second thickness near the edge of the base is greater than the second thickness at a center of the base.

24. A unitary fluid container comprising:
a sidewall; and
a base extending between an inner surface and an outer surface, the sidewall is molded to the base and extending from an edge of the base, the base comprising:
a first portion comprising a first thickness between the inner surface and the outer surface;
a second portion comprising a plurality of lobes extending radially outward from a center of the base to the edge of the base, the plurality of lobes having a second thickness between the inner surface and the outer surface,
wherein the inner surface of the base is substantially planar, wherein the sidewall and the base comprise expanded plastic, and
wherein the expanded plastic at a location of the second portion is expanded more than the expanded plastic at a location of the first portion so the second thickness is greater than the first thickness such that when the base of the container is placed on a surface the plurality of lobes contact the surface and the first portion does not contact the surface.

25. The unitary fluid container of claim 24, wherein each of the plurality of lobes are connected.

* * * * *